United States Patent [19]
Sano et al.

[11] Patent Number: 5,851,693
[45] Date of Patent: *Dec. 22, 1998

[54] ORGANIC ELECTROLYTE BATTERIES

[75] Inventors: Akihiro Sano; Shuichi Nishino, both of Hirakata; Fumio Daio, Kitakatsuragi-gun; Shusuke Oguro, Ikoma; Masatsugu Kondo, Hirakata, all of Japan

[73] Assignee: Matsushita Electric Industrial Co., Ltd., Osaka, Japan

[ * ] Notice: The term of this patent shall not extend beyond the expiration date of Pat. No. 5,656,392.

[21] Appl. No.: 788,082

[22] Filed: Jan. 22, 1997

Related U.S. Application Data

[63] Continuation of Ser. No. 538,097, Oct. 2, 1995, Pat. No. 5,656,392.

[30] Foreign Application Priority Data

Mar. 20, 1995 [JP] Japan ................................ 7-60767

[51] Int. Cl.⁶ ........................... H01M 2/08; H01M 6/14
[52] U.S. Cl. .................... 429/174; 429/194; 429/185; 204/252
[58] Field of Search ...................... 429/129, 174, 429/175, 176, 185, 248, 194, 54; 204/296, 252

[56] References Cited

U.S. PATENT DOCUMENTS

| | | | |
|---|---|---|---|
| 4,048,392 | 9/1977 | Garoutte | 429/105 |
| 4,327,166 | 4/1982 | Leger | 429/194 |
| 5,057,386 | 10/1991 | Gordy | 429/174 |
| 5,114,811 | 5/1992 | Ebel et al. | 429/194 |

FOREIGN PATENT DOCUMENTS

| | | |
|---|---|---|
| 165795 | 12/1985 | European Pat. Off. . |
| 0599654 | 6/1994 | European Pat. Off. . |
| 2366705 | 4/1978 | France . |
| 53-055744 | 5/1978 | Japan . |
| 54-022527 | 2/1979 | Japan . |
| 55-021860 | 2/1980 | Japan . |
| 55-028238 | 2/1980 | Japan . |
| 58-112246 | 7/1983 | Japan . |
| 59-000859 | 1/1984 | Japan . |
| 59-224073 | 12/1984 | Japan . |
| 61-002260 | 1/1986 | Japan . |
| 61-066360 | 4/1986 | Japan . |
| 61-074256 | 4/1986 | Japan . |
| 61-294757 | 12/1986 | Japan . |
| 2126554 | 5/1990 | Japan . |
| 04093009 | 3/1992 | Japan . |
| 5013059 | 1/1993 | Japan . |
| 08031429 | 2/1996 | Japan . |
| 2139409 | 11/1984 | United Kingdom . |
| WO95/06332 | 3/1995 | WIPO . |

OTHER PUBLICATIONS

Beilstein entry for gamma–butyrolactone (computer data-base—STN), Jul. 1998.

Encyclopedia of POlymer Science and Engineering (1989, publ. John–Wiley, vol. 16, p. 590), Jul. 1989.

Abstract of JP54–022527 (Daini Seikosha), Feb., 1979.

European Search Report dated Jul. 12, 1996.

*Primary Examiner*—Robert J. Warden
*Assistant Examiner*—Alexander Noguerola
*Attorney, Agent, or Firm*—Ratner & Prestia

[57] ABSTRACT

A general purpose organic electrolyte cell usable for long-periods or usable after long periods of storage even in a high temperature environment exceeding 150° C. The positive and the negative electrodes are separated by using a separator made of porous synthetic resin sheet having a melting point of at least 170° C.

4 Claims, 2 Drawing Sheets

ORGANIC ELECTROLYTE BATTERIES

This application is a continuation of application Ser. No. 08/538,097, filed Oct. 2, 1995, which is now U.S. Pat. No. 5,656,392, on Jun. 18, 1998.

BACKGROUND OF THE INVENTION

This invention relates to organic electrolyte batteries employing an active material of negative electrode made of metallic lithium, lithium alloy, or intercalation compound formed between lithium and carbon or lithium and metal oxide and an organic electrolyte, enabling long period use and/or storage under a high-temperature and high-humidity environment.

Whereas organic electrolyte or solid polymer electrolyte has been used as the non-aqueous electrolyte for battery, the organic electrolyte has been prepared by dissolving lithium salt as a solute into an aprotic organic solvent because of its high stability even in the very active metallic lithium and composition having a low melting point.

Because of its excellent low temperature characteristics, a wide operating temperature range, and the superior long-period storage characteristics of the organic electrolyte batteries, it have been used extensively not only as the main power sources for various applications such as consumer-use electronic watch, electronic note-book, auto-focus camera, and etc., but as the memory back-up power-supplies incorporated in various electronic circuits which is expanding very rapidly in recent.

As for these backup power-supplies, not only the lithium-graphite fluoride, Li/(CF)$_n$ and lithium-manganese dioxide, Li/MnO$_2$ system primary batteries, but more of the lithium secondary batteries are used recently.

A typical longitudinal cross-sectional view of Li/(CF)$_n$ system coin-type organic electrolyte lithium cell is shown in FIG. 1 wherein the metallic lithium acting as negative electrode 2 is compressed in one body to the inner surface of cover case 1 made of stainless steel acting as a negative terminal, gasket 6 is mated on the flange of cover case 1, positive electrode 3 molded mainly of (CF)$_n$ active material is pressed on a current collector made of titanium lath connected on the inner bottom surface of case 5 made of stainless-steel (made of SUS 304; containing Cr 18%, Ni 8%) acting as a positive terminal, and negative electrode 2 and positive electrode 3 are separated by separator 4.

The organic electrolyte is impregnated and held within a pore formed between the positive electrode 3 and the separator 4. The flange of metal case 5 is curled and pressed on the gasket 6 placed between the cover 1 and the case 5 to seal the cell.

Conventionally, sealant layer 8 made mainly of blown-asphalt is disposed in advance at least on the surface of gasket 6 contacted with cover case 1 in order to improve the sealing performance. In a conventional Li/(CF)$_n$ system organic electrolyte lithium cell, a separator made of polypropylene (PP) non-woven cloth, a gasket made mainly of polypropylene (PP) resin, and an organic electrolyte prepared by dissolving a solute of lithium fluoborate (LiBF$_4$) into a high-boiling point solvent, γ-butylolactone (BL), or into a mixed solvent consisted of BL and a low boiling point solvent 1,2-dimethoxyethane (DME) mixed at a concentration of 1.0 mol/l has been used.

The thermal decomposition temperature of graphite fluoborate employed as a positive active material in Li/(CF)$_n$ system cell employing organic electrolyte is within a temperature range from 320° to 420° C. producing no melting deformation up to the melting point of metallic lithium which is 180.54° C. when it is used as the negative electrode.

Since the thermal decomposition temperature of lithium fluoride (LiF) which Is a discharge product is 848° C., the Li/(CF)$_n$ system cell can be primarily a thermally stable cell. Thus, the long-period storage and/or use of conventional Li/(CF)$_n$ system cell for more than 10 years in a temperature range of −40°−+60° C. had been possible.

The prevention of external leakage of internal cell-elements such as the electrolyte and the liquid- and gas-tightnesses preventing the intrusion of external air and moisture into the cell can be realized generally by applying a sealing such as a gasket made of synthetic resin having a high resistance against the electrolyte and high electrical insulation characteristics between the metal case acting as a positive terminal and the metal case acting as a negative terminal regardless the types of cell including the coin-type, button type, wafer-type, and the cylindrical type.

With the recent rapid advancement of electronics technologies, the field demanding memory-backup cells have been expanding very rapidly. Accordingly, the cell has to withstand against more rigorous conditions such as the higher-temperature and higher humidity possible within automobile engine compartment or outdoor environments in which industrial equipments are installed and operated.

Moreover, no deterioration of the cell characteristics is permissible even when the cell is mounted on a printed circuit board together with other electronic components being exposed to a rigorous high temperature condition of reflow soldering.

For the organic electrolyte other than that for the Li/(CF)$_n$ system, a solvent obtained by mixing propylene carbonate (PC) having a high-boiling point with 1,2-dimethoxyethane (DME) having a low boiling point is used extensively. The purpose of the addition of low boiling point solvent is to lower the viscosity of electrolyte and to improve the high-rate discharge characteristics including the pulse discharge characteristics.

However, when the coin-type or wafer-type cell having a larger cell cross-section, compared with the thickness of cell container, is placed in a high-temperature environment, the low-boiling point solvent in the electrolyte would be gasified increasing the internal pressure of cell and swelling the cell container. In an extreme case, this may produce a gap in the seal causing a leak of vapor of the low boiling point solvent.

At this condition, a number of problems such as the deteriorations of cell characteristics including the change of electrolyte composition, leak of organic electrolyte itself, intrusion of air from outside, or an increase of internal resistance caused by an oxide layer formed on the lithium negative electrode due to the moisture contained in air, are possible.

In order to solve these problems, the cell having a high heat-resistance has to be developed. In order to accomplish this, extensive efforts improving the heat-resistance of organic cell-materials such as the gasket, sealant, separator, etc., including the composition of electrolyte had been made. For example, U.S. Pat. No. 5,246,795 and Japanese Patent Publication Hei 5-58232 show proposals resulting from these efforts, but the practical effects of these can never be satisfactory.

Furthermore, a cell of hermetically sealed construction employing a cover on which the positive terminal is glass-to-metal sealed is welded on the upper flange of negative polarity case by laser had been developed. Although the reliability of this structure is excellent, the cost of components is almost forbidding for producing the general purpose cells.

Since the melting point of PP resin used conventionally for making the separator or gasket in the Li/(CF)$_n$ system organic electrolyte cell is relatively high, this has been used as a general purpose resin of high heat-resistance. Whereas the continuous service of mold of PP resin is possible at conditions of and a relatively low loading stress and is possible even at a temperature as high as 150° C. if no load is applied. However, deformation of the gasket due to cold flow is possible at a temperature less than 100° C. if the gasket is subjected to a high loading stress. Thus, the above mentioned problem could be possible when the cell is subjected to a long storage period and/or use condition at a higher temperature exceeding 60° C.

SUMMARY OF THE INVENTION

The present Invention is to offer a high reliability and high general-utility organic electrolyte cell usable at high temperature such as Li/(CF)$_n$ system organic electrolyte cell employing proper heat resistant components and a cell construction solving the conventional problems caused by long-period use and/or storage.

In order to accomplish this objective, this invention is to offer a sealed organic electrolyte cell obtained by using; an active material of negative electrode made either of light-metal such as lithium, light-metal alloy consisted mainly of lithium, or an intercalation compound formed between alkaline metal such as lithium and carbon or metal oxide; an organic electrolyte obtained by dissolving a solute such as lithium salt into an organic solvent or a mixed organic solvent having a high boiling point of at least 170° C.; a separator made of porous synthetic resin sheet having a high electrolyte resistance, a excellent electrolyte holding ability and a melting point of at least 170° C., separating the positive electrode from said negative electrode; and a gasket made of thermoplastic synthetic resin only or made mainly of thermoplastic synthetic resin having a high electrolyte resistance and a continuously usable temperature of at least 150° C., pre-coated with a sealant layer made mainly of blown-asphalt; and by sealing the positive polarity metal container and the negative polarity metal container by curling the upper flange of one of the metal containers of either negative or positive polarity compressing said gasket placed between the positive polarity metal container and the negative polarity metal container.

DETAILED DESCRIPTION OF THE INVENTION

The present invention is an organic electrolyte cell capable of long period use and/or storage at a temperature of more than 150° C. realized by employing suitable heat-resistant components and a structure, expanding significantly the utility thereof.

EXAMPLE 1

Various gaskets made of heat-resistant resins designed for a Li/(CF)$_n$ system Model No. BR1225 cell (having an outer diameter of 12.5 mm and an overall height of 2.5 mm) are prepared by a injection molding method. A volume of 100 ml of electrolyte prepared by dissolving LiBF, into γ-butyrotactive solvent at a concentration of 1.0 mol/l. is poured into a wide-mouthed reagent bottle in which 10 each gaskets made of various resins are placed. After tight sealing of the bottle, this bottle is kept for a period of 40 days at a temperature of 150° C.

The electrolyte resistance characteristics of these gaskets are then determined by conducting visual inspections and the observed weight-changes, and these results are shown in Table 1.

TABLE 1

| No. | Kinds of Resin | Electrolyte Resistance Test |
|---|---|---|
| 1. | Polyphenylene sulfide (PPS) | Unchanged |
| 2. | Tetrafluoride-perfluoroalkyl vinylether copolymer (PFA) | Unchanged |
| 3. | Polyether ketone (PEK) | Unchanged |
| 4. | Polyetherether ketone (PEEK) | Unchanged |
| 5. | Polyether sulfone (PES) | Dissolved |
| 6. | Polysulfone (PSu) | Dissolved |
| 7. | Polyamide imide (PAI) | Dissolved |
| 8. | Polyether imide (PEI) | Dissolved |

Table 1 shows resins having higher electrolyte resistance characteristics among eight kinds of resins, and these are polyphenylene sulfide (PPS), tetrafluoride-perfluoroalkyl vinylether copolymer (PFA), polyether ketone (PEK), and polyetherether ketone (PEEK). Among these, the gasket made of PEEK resin is the one proposed by the before-mentioned U.S. Pat. No. 5,246,795.

Figure 1:
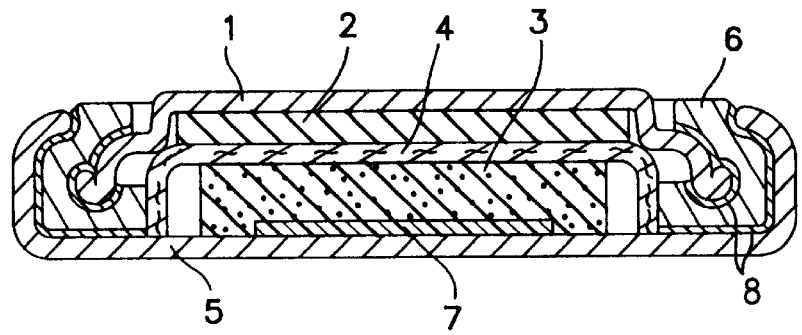
FIG. 1 is a longitudinal cross-sectional view showing a typical structure of Li/(CF)$_n$ system coin-type organic electrolyte cell.

Employing gaskets made of four kinds of resin of which excellent electrolyte resistance characteristics had been confirmed, BR1225 type Li/(CF)$_n$ system coin-cells (having a nominal capacity of 48 mAh) have been prepared. In these cases, at least the surface of these gaskets contacted with the cell cover and case are pre-coated by a paint obtained by dissolving blown-asphalt added with a mineral oil into a solvent and dried afterward in order to form a sealant layer made mainly of blown-asphalt thereon. In addition to this, the materials and components same as the ones shown in FIG. 1 except the separator and gasket, are employed.

In addition to this, a separator made of polybutylene-terephthalate (PBT) fiber non-woven cloth (fiber diameter less than 15.0 μm, fiber weight per unit area within a range of 25.0–100.0 g/m$^2$, and an average pore diameter of 10.0–60.0 μm) instead of the conventional PP fiber non-woven cloth is used.

A high-temperature storage test for a period of 40 days at 150° C., and a tropical storage test for a period of 40 days at a condition of 60° C. and 90% RH, are conducted for 50 cells of this type.

During these tests, the open-circuit voltages and the internal impedances of all the cells are measured (at AC 1000 Hz) once in 10 days after the cell conditions are brought back to a condition of ordinary temperature and humidity, and all of these values are averaged. Results of these high-temperature storage test and high-temperature and high humidity storage tests are shown in Tables -2 and 3 respectively.

TABLE 2

| Stor-<br>rage<br>days | Cell No. | | | | | | | |
|---|---|---|---|---|---|---|---|---|
| | 1 | | 2 | | 3 | | 4 | |
| | Kinds | | | | | | | |
| | PPS resin | | PFA resin | | PEK resin | | PEEK resin | |
| | O.C.V.<br>(V) | I.I.<br>(Ω) | O.C.V.<br>(V) | I.I.<br>(Ω) | O.C.V.<br>(V) | I.I.<br>(Ω) | O.C.V.<br>(V) | I.I.<br>(Ω) |
| 0 | 3.41 | 43 | 3.41 | 43 | 3.41 | 43 | 3.41 | 43 |
| 10 | 3.41 | 79 | 3.40 | 77 | 3.39 | 83 | 3.38 | 86 |
| 20 | 3.40 | 111 | 3.40 | 115 | 3.37 | 123 | 3.37 | 128 |
| 30 | 3.38 | 123 | 3.38 | 124 | 3.36 | 133 | 3.35 | 141 |
| 40 | 3.38 | 139 | 3.37 | 141 | 3.34 | 147 | 3.35 | 152 |

TABLE 3

| Stor-<br>age<br>days | Cell No. | | | | | | | |
|---|---|---|---|---|---|---|---|---|
| | 1 | | 2 | | 3 | | 4 | |
| | Kinds | | | | | | | |
| | PPS resin | | PFA resin | | PEK resin | | PEEK resin | |
| | O.C.V<br>(V) | I.I.<br>(Ω) | O.C.V<br>(V) | I.I.<br>(Ω) | O.C.V.<br>(V) | I.I.<br>(Ω) | O.C.V.<br>(V) | I.I.<br>(Ω) |
| 0 | 3.41 | 43 | 3.41 | 43 | 3.41 | 43 | 3.41 | 43 |
| 10 | 3.41 | 49 | 3.41 | 51 | 3.40 | 93 | 3.22 | 100 |
| 20 | 3.41 | 62 | 3.41 | 63 | 3.38 | 236 | 3.16 | 245 |
| 30 | 3.41 | 71 | 3.41 | 73 | 3.37 | 385 | 3.11 | 494 |
| 40 | 3.40 | 85 | 3.40 | 87 | 3.35 | 538 | 3.01 | 680 |

Note: O.C.V. means open-circuit voltage, and I.I. means internal impedance.

Although the results in Tables -2 and -3, show gradual decreases of open-circuit voltages and gradual increases of internal impedances of all the cells tested under a high-temperature, and a high-temperature and humidity condition in proportion to the storage days, the decrease of open-circuit voltage and the increase of internal impedance of Nos. 1 and 2 type cells employing gaskets made of PPS and PFA resin are the minimum among these, proving excellent heat resistances of these resins.

Since the gasket is permanently compressed at a condition being inserted between the negative and positive metal containers, a cold flow phenomenon takes place so that the gas and liquid tightness of the seal would be gradually lost. Since the continuously usable temperature of PPS resin among the four kinds of resin is 200° C., and that of PFA resin is 260° C. which is at least more than 150° C., these could be the reason for the excellent heat resistant cell characteristics shown during the high-temperature and the high-temperature and high-humidity tests.

In here, the continuously usable temperature is same as the temperature determined by TI (Testing Index) of the heat resistance test defined by IEC (International Electrotechnical Commission) Publication No. 216 at 20,000 hours.

EXAMPLE-2

Since the excellent performance of gaskets made of PPS and PFA resin has been confirmed, a further possibility improving the stability of gasket configuration by adding glass fiber is experimented.

In these experiments, glass fibers uniformly blended with PPS resin at 5, 10, 15, and 20 wt % are prepared and gaskets made of each of these resins are prepared by an injection mold method. Then, one hundred each BR1225 type Li/(CF)$_n$ system coin-cells using these gaskets are prepared under a condition same as that of Example-1. These one-hundred cells are examined for any leakage after these are subjected to a cyclic temperature test repeating one hour storage conditions of −10° C. and +60° C. for 60 times, and brought back to the ordinary temperature and humidity condition for the measurements. Results of these experiments are shown in Table 4.

TABLE 4

| Cell No. | Glass fiber content<br>(wt %) | Number of leaked cells |
|---|---|---|
| 1 | 0 | 0/100 |
| GF-1 | 5 | 0/100 |
| GF-2 | 10 | 0/100 |
| GF-3 | 15 | 24/100 |
| GF-4 | 20 | 43/100 |

Table 4 shows that the additive factors of glass-fiber acting as a filler are effective only up to 10%, and the leakages of electrolyte caused by fine cracks produced by thermal shock on the surface of crimp-sealed gasket which becomes brittle also when the additive factor of glass-fiber is excessively high.

In the above-shown example, only the effect of glass-fiber acting as a filler is added to PPS resin is described. However, a fact that the glass-fiber acting a an filler has been effective in the case of PFA resin only up to 10 wt % like the case of PPS resin also, has to be additionally remarked here.

EXAMPLE-3

In the case of Example-2, the effect of glass fiber acting as a filler added to PPS resin increasing the hardness of gasket has been studied. On the other hand, the effect of polyethylene (PE) or polyprolylene (PP) acting as an elastomer uniformly blended into PPS resin at a step of 2, 4, 6, 8, 10, 12, and 15 wt % obtaining a resin is experimented.

Then, one hundred each BR1225 type Li/(CF)$_n$ system coin-type cells are prepared under a condition same as that of Example-1 but using gaskets injection molded by using these resins, and the cyclic thermal-shock tests same as the ones used for Example-2 are applied to these cells, and any leakage of electrolyte after the test are examined. Results of these experiments are shown in Table 5.

TABLE 5

| Cell No. | Elastomer Ratio<br>(wt %) | | Number of leaked cells |
|---|---|---|---|
| 1 | | 0 | 0/100 |
| PE-1 | PE | 2 | 0/100 |
| PE-2 | | 4 | 0/100 |
| PE-3 | | 6 | 0/100 |
| PE-4 | | 8 | 0/100 |
| PE-5 | | 10 | 0/100 |
| PE-6 | | 12 | 1/100 |
| PE-7 | | 15 | 4/100 |
| PP-1 | PP | 2 | 0/100 |
| PP-2 | | 4 | 0/100 |
| PP-3 | | 6 | 0/100 |
| PP-4 | | 8 | 0/100 |
| PP-5 | | 10 | 0/100 |
| PP-6 | | 12 | 1/100 |
| PP-7 | | 15 | 3/100 |

Table 5 shows clearly that the cells employing gasket made of PPS resin to which PE or PP acting an elastomer is added up to 10 wt % can take the cyclic thermal-shock test conducted in a wide range of temperature difference. Although not shown here, the same effect can be obtained by using PE and PP elastomers are added at an equal rate so far as the weight ratio of elastomer is less than 10 wt %.

In another words, PE and/or PP, which are typical polyolefin system elastomers are equally effective as the elastomer to PPS resin if it is added at a weight ratio up to 10 wt %. The same tendency has been observed for the cases where the PFA resin Is used.

In addition to the above, if PE having a low melting point is blended with PPS resin or PFA resin up to a ratio of 10 wt %, a fact that the continuously usable temperature is lowered down to a little over 150° C. has to be remarked here.

EXAMPLE-4

It has been understood that the heat-resistance of organic electrolyte cell can be improved remarkably by using a gasket made of PPS resin or PPS resin to which glass-fiber acting as a filler is blended at a weight ratio less than 10% or to which a polyolefine system elastomer consisted of PE and/or PP is uniformly blend.

The seal condition of cell should depend on the holding factor of gasket thickness when a gasket is inserted between a metal container of positive polarity and a metal container of negative polarity, and these metal containers are bonded together applying a pressure on the gasket by curling the upper flange of metal container of either polarity. The holding factor of gasket thickness can be expressed by the below-shown equation.

$$\text{Holding factor of gasket thickness (\%)} = \frac{\text{Gasket thickness at the sealed part after sealing}}{\text{Gasket thickness at the sealed part with no applied load}} \times 100\%$$

Then, BR1225 type Li/(CF)$_n$ system coin-type cells are prepared by employing the components and materials same as the those of Example-1 of the invention but varying the thickness of gasket made of PPS resin or PFA resin only, realizing holding factors of gasket thickness of 30, 40, 50, 70, 90 and 95%, and these cells are subjected to a cyclic thermal-shock test, and are examined afterward for any leakage. Results of these experiments are shown in Table 6.

TABLE 6

| Cell No. | Resin kind | Holding factor (%) | Number of leaked cells |
|---|---|---|---|
| C-1 | PPS resin | 30 | 24/100 |
| C-2 | | 40 | 9/100 |
| C-3 | | 50 | 0/100 |
| C-4 | | 70 | 0/100 |
| C-5 | | 90 | 0/100 |
| C-6 | | 95 | 14/100 |
| C-7 | PFA resin | 30 | 25/100 |
| C-8 | | 40 | 10/100 |
| C-9 | | 50 | 0/100 |
| C-10 | | 70 | 0/100 |
| C-11 | | 90 | 0/100 |
| C-12 | | 95 | 13/100 |

Table 6 shows clearly the poor leakage proofing performances of Cell Nos. C-1, C-2, C-6, C-7, C-8 and C-12 of which holding factors of gasket thickness are 30, 40 and 95% respectively. Among these, those having holding factors of 30 and 40% are the cells of which gasket became too thin at the sealed part because of too high load applied on the gasket at sealing, loosing the gasket functions and resulted in a poor sealing performance.

Those having a holding factor of gasket thickness of 95%, can be attributed for the ones resulted possibly from the too low sealing pressure, resulting a poor sealing performance also.

Therefore, when the cells is sealed by using a gasket made of PPS or PFA resin, the holding factor of gasket thickness should properly be kept in a range of 50 to 90%.

Moreover, although the results are not shown here, a case where a glass-fiber filler or polyolefine system elastomer is added and blended uniformly to PPS or PFA resin at a ratio less than 10 wt %, it was confirmed that the holding factor of gasket thickness should be in a range of 50 to 90% also, like the case using gasket made only of PPS or PFA resin.

EXAMPLE-5

Fifty each BR1225 type Li/(CF)$_n$ system coin-cells employing a gasket made of PPS resin same as the case of Example-1 and other cells employing a conventional separator made of PP fiber non-woven cloth are prepared, and those cells are subjected to a 40 day high-temperature storage test at 150° C. like Example-1. The open-circuit voltages and the internal impedances (at AC 1000 Hz) of these during the high-temperature storage test period are measured and averaged, and shown in Table 7.

TABLE 7

| | Cell No. | | | |
|---|---|---|---|---|
| | 1 | | 5 | |
| | Kinds | | | |
| | PBT-fiber non-woven cloth | | PP-fiber non-woven cloth | |
| Stored days | O.C.V. (V) | I. I. ($\Omega$) | O.C.V. (V) | I. I. ($\Omega$) |
| 0 | 3.41 | 43 | 3.40 | 45 |
| 10 | 3.41 | 79 | 3.40 | 100 |
| 20 | 3.40 | 113 | 3.15 | 350 |
| 30 | 3.38 | 123 | 3.00 | 600 |
| 40 | 3.37 | 139 | 2.80 | 850 |

Note: O.C.V.: Open-circuit voltage: I. I.; Internal impedance.

Table 7 shows both remarkable decreases of the open-circuit voltage and remarkable increases of the internal impedance of cells employing even the PPS resin gasket of high-heat resistance and the cells also employing the separator made of conventional PP-fiber non-woven cloth In proportion to the high-temperature storage day.

In the cells prepared by employing separators made of conventional PP-fiber non-woven cloth, the separators are found in a half-molten condition after the test, turned into a shape of film causing a blinding of separator. Furthermore, the stability of PBT-fiber non-woven cloth acting as a separator at a high-temperature environment as high as 150° C. are reconfirmed also.

EXAMPLE-6

Although the possibility of Li/(CF)$_n$ system organic electrolyte cell having an excellent heat resistance and anti-thermal shock characteristics by using the gasket made of PPS resin and a separator made of PBT-fiber non-woven cloth, has been proved by Examples -1 to -5, the fiber diameter of PBT-fiber non-woven cloth pertinent to the separator has to be determined further.

One hundred each BR1225 type Li/(CF)$_n$ system coin-type cells employing gaskets made of PPS resin and the other components same as those of No. 1 cell of Example-1 except the separator, changing the average fiber diameter of PBT-fiber non-woven cloth in an order of 0.5, 1.0, 5.0, 10.0, 20.0 and 25.0 μm respectively.

In these cases, the PBT-fiber non-woven cloth having a fiber weight per unit area within a range of 25.0–100.0 g/m$^2$ and an average pore size of 10.0–60.0 μm same as the PBT-fiber non-woven cloth having a fiber diameter less than 15.0 μm such as the one used in Cell No. 1. is consistently used.

In order to evaluate the electrolyte absorption and holding characteristics of separator of each cell, the number of leaked cells is counted after the electrolyte of predetermined volume is injected and then sealed at the last process. After this, connecting a constant resistance load of 30 kΩ, a continuous discharge attaining an end voltage of 2.5 V at 20° C. is conducted by using 20 each cells, and after these, the averages of discharge durations are determined. The results of these tests are shown in Table 8.

TABLE 8

| Cell No. | Fiber diameter (μm) | Number of leaked cells after sealing | Discharge duration (hours) |
|---|---|---|---|
| 1 | less than 15.0 | 0/100 | 506 |
| S-1 | Average 0.5 | 0/100 | 505 |
| S-2 | Average 1.0 | 0/100 | 506 |
| S-3 | Average 5.0 | 0/100 | 505 |
| S-4 | Average 10.0 | 0/100 | 506 |
| S-5 | Average 15.0 | 1/100 | 502 |
| S-6 | Average 20.0 | 20/100 | 472 |
| S-7 | Average 25.0 | 80/100 | 427 |

The result in Table 8 shows increased numbers of leaked cells and cells showing decreased discharge durations caused by the decreased electrolyte volume in the cells particularly conspicuous when the fiber having an average fiber diameter of more than 15.0 μm is employed.

In addition to the above, the non-woven cloth made of fiber having an average diameter less than 0.5 μm can not be used as the separator because of Its low mechanical strength and difficulty of handling. Moreover, the mechanical strength required as the separator is inadequate also when the non-woven cloth made of fiber having a fiber weight per unit area is less than 25.0 g/m$^2$.

Moreover, the cloth made of fiber having a fiber weight per unit area more than 100.0 g/m$^2$ is unsuitable as the separator because of too low electrolyte absorption speed and inadequate electrolyte retentivity. Since the same can be applied to the case where the average pore diameter is less than 10.0 μm also, the cloth of such can never be practical.

One the other hand, since the chances of internal short circuit is high with the PBT-fiber non-woven cloth having an average pore diameter of more than 60.0 μm, the function as the separator can not be performed unsatisfactory.

Therefore, the PBT-fiber non-woven cloth having a fiber diameter less than 15.0 μm, or having an average fiber diameter within a range of 0.5–10.0 μm preferably, a fiber weight per unit area within 25.0–100.0 g/m$^2$, and an average pore size within a range of 10.0–60.0 μm should be employed as the suitable separator improving the heat-resistance of Li/(CF)$_n$ system organic electrolyte cells.

Although the detail of separator made of PBT-fiber non-woven cloth has been described so far, the separator made of PPS-fiber non-woven cloth derived from the PPS resin used for the gasket is effective also. In this case, the non-woven cloth made from fiber having a fiber diameter less than 30.0 μm, or an average fiber diameter within a range of 1.0–20.0 μm, and a fiber weight per unit area within 10.0–100.0 g/m$^2$ should be chosen.

Although the Li/(CF)$_n$ system organic electrolyte cell among various organic electrolyte cells employs non-woven cloth as the separator, there are other type cells using a separator made of microporous synthetic resin membrane. For example, a cylindrical Li/MnO$_2$ system cell desined for high rate discharge using an electrode group wound in a coil-shape, and lithium secondary cells using metallic lithium, lithium alloy, or intercalation compound formed between lithium and carbon or metal oxide as the active material of negative electrode.

The main reason using microporous synthetic resin membrane as the separator in these battery systems, is to prevent the incident of explosion or fire by utilizing the separator shutdown pheno-menon caused by the abnormal rise of cell temperature due to the discharge or charge performed by excessive current.

Although the microporous synthetic resin membrane made of PE and/or PP had been conventionally used as the separator, the shutdown phenomenon making the charge and discharge impossible takes place when the cell temperature rose above a temperature of 120° C. Therefore, the PE and/or PP membrane can not be used for the high-temperature organic electrolyte cell, but the microporous membrane made of polyvinylidene fluoride (PVDF) having a melting point of 170° C. could be promising, and furthermore, the microporous membrane made of polyethylene tetrafluoride (PTFE) could be promising as the separator for high-temperature organic electrolyte cells.

Summarizing the above, the present invention is to obtain a high-temperature organic electrolyte cell by separating the positive and negative electrodes by a non-woven cloth or microporous membrane separator made of synthetic resin of at least either one of the PBT, PPS, PVDF, or PTFE resins, using a gasket made of single thermoplastic PPS or PFA resin, or made mainly of these thermoplastic resins having a continuously usable temperature of at least 150° C. coated with a sealant layer made mainly of blown-asphalt, inserted between the positive and negative polarity metal containers: and by sealing the cell by curling the upper flange of either of the metal containers of negative or positive polarity compressing said inserted gasket.

EXAMPLE 7

Whereas an organic electrolyte obtained by dissolving a solute LiBF, into a solvent BL at a concentration of 1.0 mol/l has been consistently used in those Li/(CF)$_n$ system organic electrolyte cells shown in Examples -1--6, solvents making the cell better operating characteristics at temperatures higher than the conventional ones and making the cell discharge at −20° C. possible are considered here.

Table 9 shows a list of melting points (freezing points) and boiling points of several solvents suitable for the organic electrolyte.

TABLE 9

| Solvent | Melting point (°C.) | Boiling point (°C.) |
|---|---|---|
| Propylene carbonate (PC) | −49.0 | 241.0 |
| 7-Butyrolactone (BL) | −43.0 | 202.0 |
| Ethylene glycolsulfite (EGS) | −11.0 | 173.0 |
| Dimetyl sulfoxide (EMSO) | 18.8 | 189.0 |
| Sulfolan (SL) | 28.9 | 287.3 |
| Ethylene carbonate (EC) | 40.0 | 248.0 |

Considering a practical low temperature operation of organic electrolyte cell as low as −20° C., the possible solvent can be PC or BL only. Thus, BR1225 type $Li/(CF)_n$ system organic electrolyte coin-cells same as No. 1 cell in Example-1 are prepared by using solvents prepared by mixing PC and BL at various ratios, and by using organic electrolytes prepared by dissolving solute $LiBF_4$ into the solvents obtained by mixing 1,2 dimethoxy-ethane (DME) having a low boiling point into BL or into a mixed solvent at a concentration of 1.0 mol/l.

The discharge characteristics of these cells loaded with a fixed resister of 30 kΩ up to a discharge depth of 40% in a wide temperature range of −40°–85° C., and the respective operating voltages at a discharge depth of 40% are determined and compared.

Figure 2:
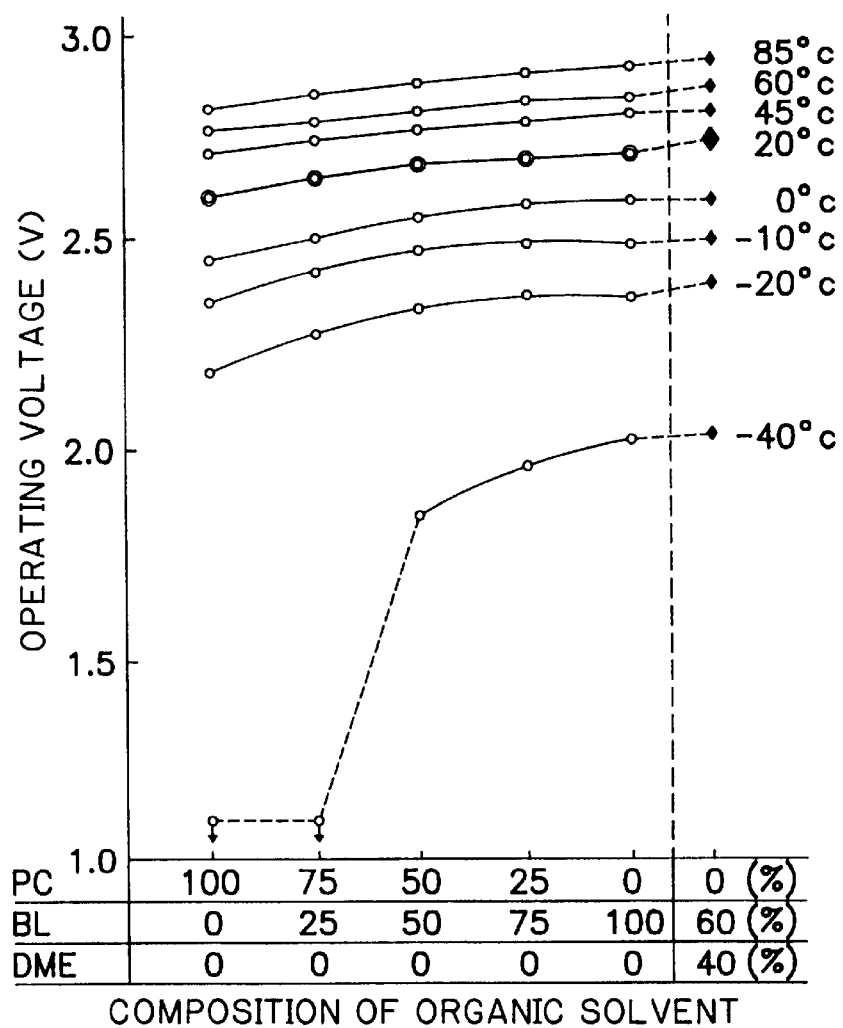
FIG. 2 is a plot of the operating voltage of the cell at a discharge depth of 40% against the composition of the organic solvent within the electrolyte for various temperatures.

The results of this experiments are shown in FIG. 2. This shows that the performance of cells using the organic electrolyte prepared by using a mixed solvent consisting of PC and BL but containing BL much more than PC, or consisting mainly of BL, can be approximated to that of the cells obtained by using the organic electrolyte prepared by using a low-boiling point DME solvent mixed with BL.

Therefore, the $Li/(CF)_n$ system organic electrolyte cells are able to operate for at long period use and/or storage under a high-temperature condition can obviously be realized even without adding a low-boiling point solvent if the lowest operating temperature of cell is limited at −20° C.

EXAMPLE-8

In these examples of the invention shown by now, the concentration of solute $LiBF_4$ of organic electrolyte used in those $Li/(CF)_n$ system cells has been fixed at 1.0 mol/l. By using the organic electrolyte dissolved into a BL-only solvent obtaining the concentrations of 0.8, 0.9, 1.0, 1.3, 1.5, and 1.6 mol/l, fifty each BR1225 type $Li/(CF)_n$ system coin-cells same as the No. 1 cell of Example-1 are prepared, and are subjected to a high-temperature 40-day storage test. The change of internal impedances (at AC 1000 Hz) during that test period and the averages of these are shown in Table 10.

TABLE 10

| Cell No. | Cell No. | | | | | |
|---|---|---|---|---|---|---|
| | E-1 | E-2 | 1 | E-3 | E-4 | E-6 |
| $LiBF_4$ solute concentration (mol/l) | 0.8 | 0.9 | 1.0 | 1.3 | 1.5 | 1.6 |
| Internal impedance (Ω) | | | | | | |
| Before storage | 48 | 46 | 43 | 43 | 45 | 46 |
| storage 10 days | 154 | 80 | 79 | 81 | 83 | 122 |
| 20 days | 317 | 113 | 111 | 116 | 118 | 283 |
| 30 days | 420 | 131 | 122 | 130 | 132 | 365 |
| 40 days | 577 | 140 | 135 | 136 | 139 | 404 |

Table 10 shows significant increases of the internal impedances of cells prepared by using the $LiBF_4$ solutes having concentrations of 0.8 and 1.6 mol/l in proportion to the number of high-temperature storage days, and the proper $LiBF_4$ solute concentration is found to be within a range of 0.9–1.5 mol/l.

EXAMPLE-9

Although the metal cases made of austenite system stainless steel SUS304 (Cr 18%, Ni 8%), have been used as the positive polarity case of $Li/(CF)_n$ system cells, the obtained high-temperature storage characteristics of these can not always be satisfactory.

Thus, by using the positive polarity containers made of ferrite system stainless steel of high chromium content and added further with molybdenum, fifty each cells same as No. 1 cell of Example-1 are prepared. After these cells are subjected to a high-temperature storage test conducted for 200 days and at 85° C., the open-circuit voltages are measured, and the result of these are shown in Table 11.

The result shown in Table 11 shows a large drop of the open-circuit voltages of No. 1 type cells prepared by using austenite stainless steel containing nickel stored at 85° C. The observation made on the disassembled cells showed a slight corrosion of the bottom of metal container making a contact with the positive electrode and a black contamination due to the deposition of impurities appeared on the negative electrode made of metallic lithium.

TABLE 11

| Cell Nos. | Composition of stainless steel (wt %) | Open-circuit voltage (V) Storage days | | |
|---|---|---|---|---|
| | | 0 | 100 | 200 |
| 1 | Cr: 18, Ni: 8 | 3.41 | 3.15 | 2.90 |
| SS-1 | Cr: 10 | 3.41 | 3.25 | 2.90 |
| SS-2 | Cr: 15 | 3.41 | 3.36 | 2.90 |
| SS-3 | Cr: 16 | 3.41 | 3.37 | 3.15 |
| SS-4 | Cr: 18 | 3.41 | 3.37 | 3.32 |
| SS-5 | Cr: 20 | 3.41 | 3.37 | 3.34 |
| SS-6 | Cr: 15 Mo: 0.5 | 3.41 | 3.37 | 3.34 |
| SS-7 | Cr: 18 Mo: 0.5 | 3.41 | 3.40 | 3.40 |
| SS-8 | Cr: 18 Mo: 1.0 | 3.41 | 3.40 | 3.40 |
| SS-9 | Cr: 18 Mo: 2.0 | 3.41 | 3.40 | 3.40 |
| SS-10 | Cr: 18 Mo: 3.0 | 3.41 | 3.38 | 3.35 |

Although the drop of open-circuit voltage is observed with the containers made of ferrite system stainless steel containing chromium also, the observed open-circuit voltage drop is less when the containers made of same stainless steel but containing chromium for more than 16 wt % are used.

With the cells made of stainless steel containers virtually free of nickel but containing chromium for more than 15 wt %, to which molybdenum is added for more than 0.5%, no corrosion of cells are observed after the disassembling of cells, and no open-circuit voltage drop are observed also, proving the substantial effect of the type of employed steel improving the high-temperature storage characteristics significantly.

The BR1225 type Li/(CF)$_n$ system coin-cells of the invention employing PPS resin gaskets, separators of PBT-fiber non-woven cloth, containers made of stainless steel containing Cr at 18% and Mo at 2.0 wt %, and an electrolyte obtained by dissolving LiBF$_4$ into BL at a concentration of 1.0 mol/l, and same type cells employing gaskets made of PP resin, separators of PP-fiber non-woven cloth, containers made of stainless steel containing Ni at 18 wt % and Cr at 8 wt %, electrolyte obtained by dissolving LiBF$_4$ into a mixture of BL and DME at a concentration of 1.0 mol/l, and other components same as those of cell No. 1 cell of Example-1 except those shown above, are prepared under similar conditions.

These cells of two types are subjected to a same high-temperature storage test in an environment of 150° C. for 40 days, and the open-circuit voltages and the cell weights are measured at an interval of 10 days. Assuming the decreased weight of cell is responsible to the loss of electrolyte, the average remaining rate of electrolyte and the discharge capacity at 20° C. and at a condition of 30 kΩ continuous discharge (until an end voltage of 2.5 V; average of 20 cells) are determined, and these results are shown in FIGS. 3 and 4, and Table 12 respectively.

TABLE 12

| | kinds | | | |
|---|---|---|---|---|
| | Invented cells | | Conventional Cells | |
| Storage days | Discharge capacity (mAh) | Retention rate of capacity (%) | Discharge capacity (mAh) | Retention rate of capacity (%) |
| 0 | 48 | 100 | 48 | 100 |
| 10 | 45 | 93 | 5 | 11 |
| 20 | 39 | 81 | 0 | 0 |
| 30 | 36 | 75 | 0 | 0 |
| 40 | 30 | 82 | 0 | 0 |

Figure 3:
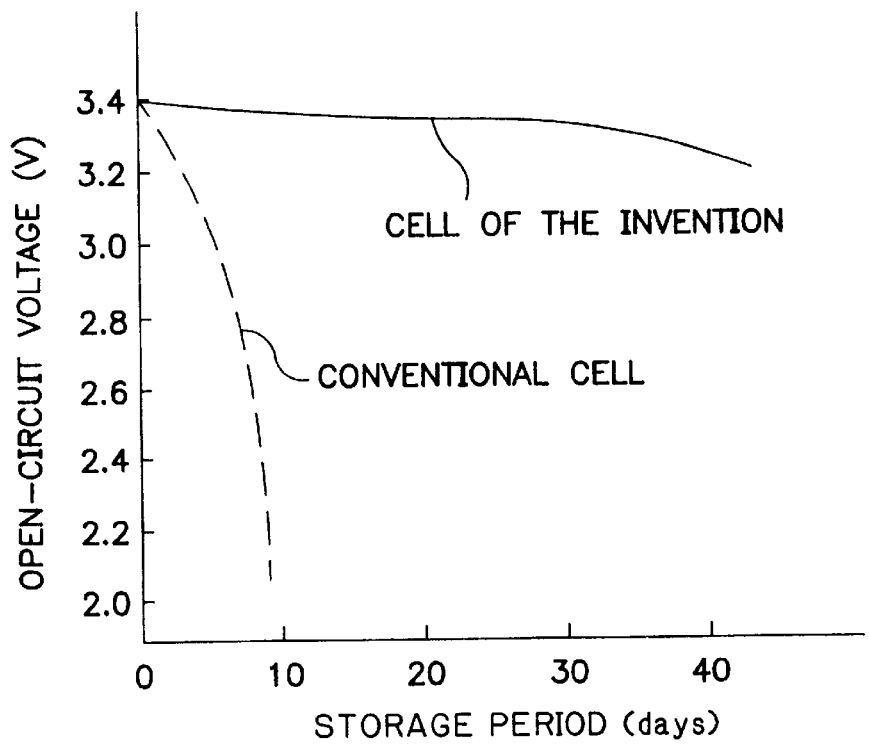
FIG. 3 is a plot of open-circuit voltage against storage period for Li/(CF)$_n$ system cells stored at 150° C.
Figure 4:
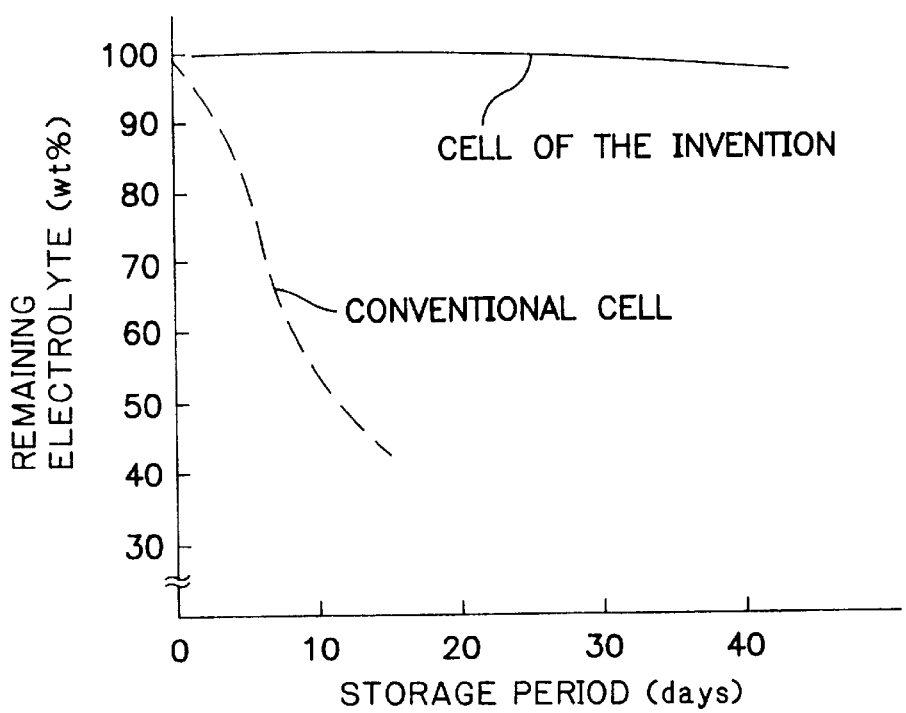
FIG. 4 is a plot of remaining electrolyte against storage period for Li/(CF)$_n$ system cells stored at 150° C.

As shown in FIG. 3, there is a rapid decrease of the open-circuit voltage as the number of high-temperature storage days increases for the conventional cells. This could be related to the remaining rate of electrolyte shown in FIG. 4, and this could be further related to the decrease of electrolyte caused by the leakage of DME and the deterioration of lithium negative electrode caused by the corrosion of the metal container.

As shown in Table 12, in contrast to the retention rate of capacity of 0% of conventional cells after the 20 day 150° C. storage, the cells of invention showed the retention rate of capacity of 81% after the same storage period, and even a rate of 62% after a 40 day storage test.

As described the detail in the above, the present invention is to obtain general purpose organic electrolyte cells of high cost-performance suited for the long-period use and/or storage under a rigorous environment of high temperature which had been considered impossible. These are now realized by using cell components including a new gasket and separator of high heat resistance and new industrial materials, and by utilizing the composite effects of these.

Furthermore, by applying the present invention, rapid expansion of application of general-purpose organic electrolyte cells including the rechargeable cells has been accomplished.

What is claimed is:

1. An organic electrolyte cell, comprising:

a positive electrode;

a negative electrode comprising lithium; and an organic electrolyte comprising a solvent selected from the group consisting of an organic solvent and a mixed organic solvent, said solvent having a boiling point of at least 170° C.;

wherein the positive electrode and the negative electrode are separated by a separator made of porous synthetic resin sheet having a melting point of at least 170° C. and a gasket consisting essentially of a thermoplastic synthetic resin having a continuously usable temperature of at least 150° C. said gasket having a surface pre-coated with a sealant layer consisting essentially of blown asphalt, said gasket inserted between a metal container of positive polarity and a metal container of negative polarity, said metal containers sealed by curling the upper flange of one of said metal container of positive polarity and said metal container of negative polarity and by applying pressure on said gasket inserted between said metal containers.

2. An organic electrolyte cell according to claim 1, wherein said organic electrolyte is obtained by dissolving lithium salt as a solute into said solvent having a boiling point of at least 170° C.

3. An organic electrolyte cell according to claim 2, wherein said solute is lithium fluoborate and said solvent is selected from the group consisting of a γ-butyrolactone single solvent and a high-boiling point mixed solvent consisting mainly of γ-butyrolactone at a concentration of 0.9–1.5 mol/l.

4. An organic electrolyte cell according to claim 1, wherein said separator is made of synthetic resin having a form of a non-woven cloth or microporous membrane.

\* \* \* \* \*